US012112610B2

(12) United States Patent
Arnao

(10) Patent No.: US 12,112,610 B2
(45) Date of Patent: Oct. 8, 2024

(54) AUDIBLE ALARM SIGNAL DETECTORS

(71) Applicant: The ADT Security Corporation, Boca Raton, FL (US)

(72) Inventor: Michael A. Arnao, Collegeville, PA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/091,104

(22) Filed: Dec. 29, 2022

(65) Prior Publication Data

US 2024/0221487 A1    Jul. 4, 2024

(51) Int. Cl.
| G08B 25/00 | (2006.01) |
| G01H 3/08 | (2006.01) |
| G06F 3/16 | (2006.01) |
| G06F 18/26 | (2023.01) |

(52) U.S. Cl.
CPC ............ G08B 25/00 (2013.01); G01H 3/08 (2013.01); G06F 3/16 (2013.01); G06F 18/26 (2023.01)

(58) Field of Classification Search
CPC .......... G08B 25/00; G06F 18/26; G06F 3/16; G01H 3/08
USPC ......................................................... 340/501
See application file for complete search history.

(56) References Cited

U.S. PATENT DOCUMENTS

| 9,812,001 | B1 | 11/2017 | Grant | |
|---|---|---|---|---|
| 9,852,620 | B1 | 12/2017 | Hoeft | |
| 10,871,943 | B1 * | 12/2020 | D'Amato | ............... G06F 3/165 |
| 10,978,050 | B2 | 4/2021 | Khadloya et al. | |
| 2003/0158484 | A1 * | 8/2003 | Pan | .................... G01S 7/52046 |
| | | | | 600/453 |
| 2004/0145467 | A1 | 7/2004 | Roby et al. | |
| 2006/0017561 | A1 | 1/2006 | Albert | |
| 2017/0011619 | A1 | 1/2017 | Bass et al. | |
| 2020/0200863 | A1 * | 6/2020 | Booij | ......................... G01S 5/18 |
| 2020/0213728 | A1 * | 7/2020 | Lopatka | ............... G01S 3/8083 |
| 2020/0233499 | A1 * | 7/2020 | Tkaczuk | ............... G06F 1/1684 |
| 2020/0267040 | A1 * | 8/2020 | Nguyen | ............. H04L 27/2602 |
| 2022/0061797 | A1 * | 3/2022 | Vernalis | ............... A61B 5/7264 |

* cited by examiner

Primary Examiner — Naomi J Small
(74) Attorney, Agent, or Firm — Weisberg I.P. Law, P.A.

(57) ABSTRACT

A device is provided. The device includes processing circuitry configured to detect an audio signal associated with an alarm event, generate a spectrogram using a plurality of input samples of the audio signal where the spectrogram includes a plurality of spectral bins, select one of the plurality of spectral bins associated with a predefined frequency range, perform edge detection on the selected one of the plurality of spectral bins, perform pattern detection based on the edge detection, determine the audio signal corresponds to an audio alarm signal based on the pattern detection, and trigger an action in response to determining that the audio signal corresponds to an audio alarm signal.

16 Claims, 5 Drawing Sheets

AUDIBLE ALARM SIGNAL DETECTORS

TECHNICAL FIELD

The present disclosure relates to spectrogram-based alarm signal detection.

BACKGROUND

Various premises security devices are equipped to detect audible audio alarm signals that are emitted, for example, by fire alarms, smoke alarms, and carbon monoxide alarms. This feature enables designated parties who may be off-premises to be notified of the detected event.

Some alarm signals consist of a tone, such as an audible square wave, that has a fixed fundamental frequency and is pulsed on and off according to a specific temporal pattern that corresponds to the type of alarm. The exact frequency of the tone may be unknown to a premises security device, though the frequency value may be specified to fall within one or more ranges. Temporal pattern specifications may allow for a tolerance of, for example, +/−10%, in the duration of each pulse-on and pulse-off phase.

BRIEF DESCRIPTION OF THE DRAWINGS

A more complete understanding of the present disclosure, and the attendant advantages and features thereof, may be more readily understood by reference to the following detailed description when considered in conjunction with the accompanying drawings wherein.

DETAILED DESCRIPTION

Figure 1:
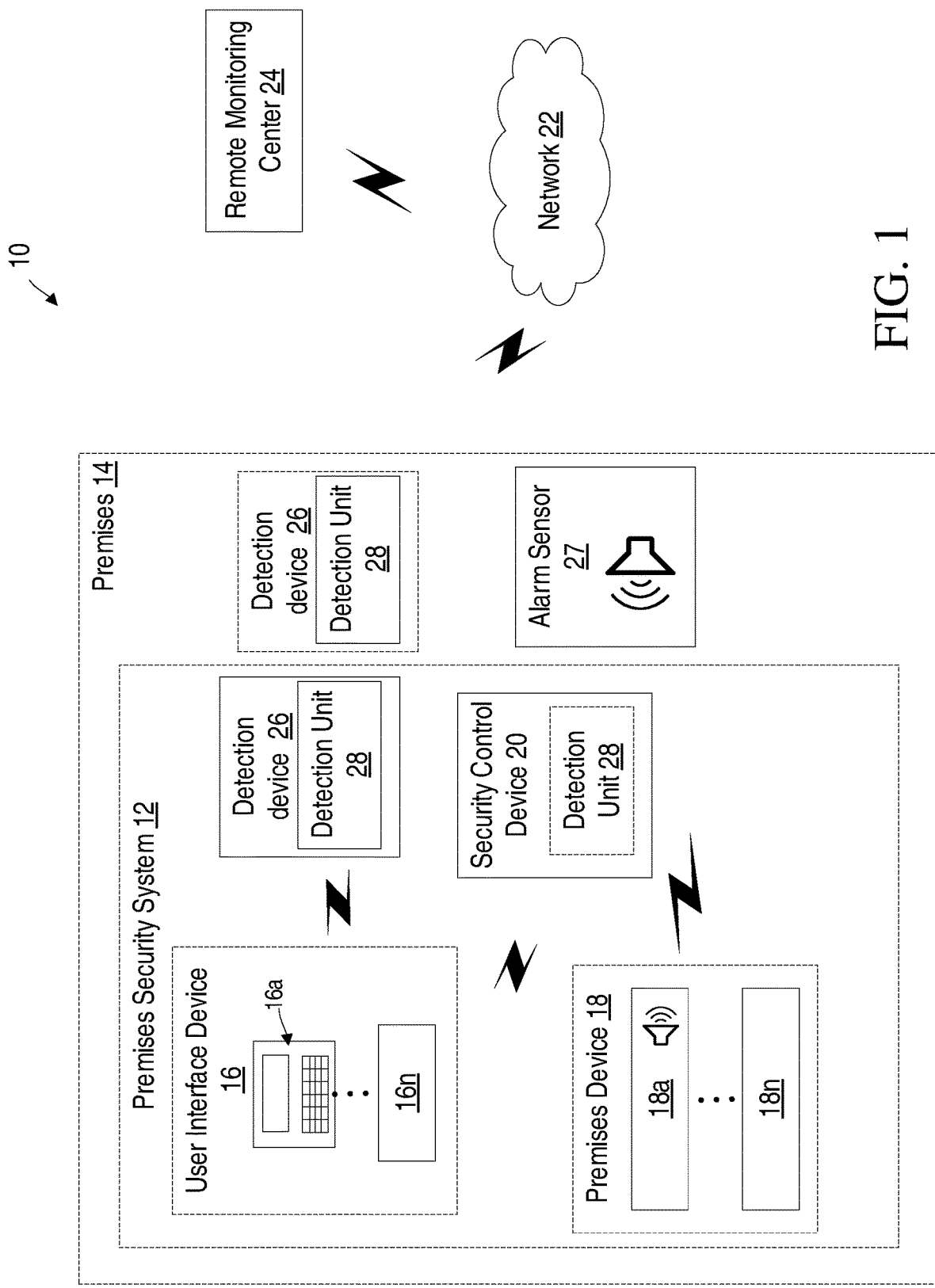
FIG. 1 is a diagram of an example system according to the principles of the present disclosure.

The present disclosure relates to providing spectrogram-based feature extraction for pattern detection decisions, as described herein.

Before describing in detail exemplary embodiments, it is noted that the embodiments may reside in combinations of apparatus components and processing steps related to spectrogram-based alarm signal detection. Components may be represented by conventional symbols in the drawings, focusing only those specific details that facility understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes," "including," "has," and "having," when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The apparatuses, methods, devices, and systems described herein perform to spectrogram-based alarm signal detection.

Referring now to the drawing figures in which like reference designators refer to like elements there is shown in FIG. 1 a system designated generally as "10." System 10 may include premises security system 12 that is configured to monitor premises 14. Premises security system 12 includes and/or is associated with one or more user interface devices 16a to 16n (collectively referred to as "user interface device 16"), one or more premises devices 18a to 18n (collectively referred to as "premises device 18"), and security control device 20. System 10 may further include one or more networks 22 (collectively referred to as "network 22"), and one or more remote monitoring centers 24 (collectively referred to as "remote monitoring center 24"), communicating with each other or with at least one other entity in system 10.

System 10 may include detection device 26 which is in communication with one or more of network 22, remote monitoring center 24, security control device 20, among other entities in system 10. Detection device 26 includes detection unit 28 which is configured to perform one or more detection device 26 functions described herein such as with respect to spectrogram-based alarm signal detection as described herein. In one or more embodiments, detection device 26 is part of premises security system 12 or separate from the premises security system 12 where detection device 26 may be configured to detect audible alarm signals from one or more of premises devices 18 (e.g., premises device 18a that is able to emit an audible signal) and 3rd party devices (e.g., 3rd party life safety devices such as alarm sensor 27) that may not be in communication with security control device 20.

User interface device 16 may be a wireless device that allows a user to communicate with security control device 20. User interface device 16 may be a portable control keypad/interface 12a, computer, mobile phone and tablet, among other devices that allow a user to interface with security control device 20 and/or one or more premises devices 18. User interface device 16 may communicate at least with security control device 20 using one or more wired and/or wireless communication protocols well known to those of ordinary skill in the art. For example, portable control keypad 16a may communicate with security control device 20 via a ZigBee based communication link, e.g., network based on Institute of Electrical and Electronics Engineers (IEEE) 802.15.4 protocols, and/or Z-wave based communication link, or over the premises' local area network, e.g., network-based on IEEE 802.11 protocols.

Premises devices 18 may include one or more types of life safety related sensors, control and/or image capture devices. For example, the types of sensors may include various safety related sensors such as motion sensors, infrared sensors, fire sensors, heat sensors, carbon monoxide sensors, flooding sensors and contact sensors, among other sensor types that are known in the art. That is, life safety features may correspond to security system functions and settings associated with premises conditions that may result in life threatening harm to a person such as carbon monoxide detection, fire detection, smoke detection, intrusion detection, etc. One or more premises devices 18 such as a life safety based premises device 18 may be configured to generate an audible alarm signal that may be detected by the spectrogram-based feature extraction described herein.

The premises devices 18 may include, for example, one or more lifestyle (e.g., home automation) related devices configured to adjust at least one premises setting such as lighting, temperature, energy usage, door lock and power settings, among other settings associated with the premises or devices on the premises. Image capture devices may include a digital camera and/or video camera, among other image captures devices. Premises device 18 may communicate with security control device 20 via proprietary wireless communication protocols and may also use Wi-Fi. Other communication technologies can also be used, and the use of Wi-Fi is only for example purposes. Those of ordinary skill in the art will also appreciate that various additional sensors and control and/or image capture devices may relate to life safety or lifestyle depending on both what the sensors, control and image capture devices do and how these sensors, control and image devices are used by system 10.

Security control device 20 may provide one or more management functions and monitoring functions, analysis functions, control functions such as power management, premises device management and alarm management/analysis, among other functions to premises security system 12. In particular, security control device 20 may manage one or more life safety and lifestyle features. Security control device 15 may communicate with network 22 via one or more communication links. In particular, the communications links may be broadband communication links such as a wired cable modem or Ethernet communication link, and digital cellular communication link, e.g., long term evolution (LTE) and/or 5G based link, among other broadband communication links known in the art. Broadband as used herein may refer to a communication link other than a plain old telephone service (POTS) line. Ethernet communication link may be an IEEE 802.3 or 802.11 based communication link. Network 22 may be a wide area network, local area network, wireless local network and metropolitan area network, among other networks known in the art. Network 22 may provide communications between security control device 20 and remote monitoring center 24. In one or more embodiments, security control device 20 may be part of premises device 18 or user interface device 16.

While security control device 20 is illustrated as being a separate device from user interface device 16 (e.g., control panel) and premises device 18, in one or more embodiments, security control device 15 may be integrated with one or more user interface devices 16 and/or premises devices 18 and/or other entity/device located at premises associated with premises security system 12.

Example implementations, in accordance with one or more embodiments, of control device 15 and imitation device 17 discussed in the preceding paragraphs will now be described with reference to FIGS. 2 and 3.

Figure 2:
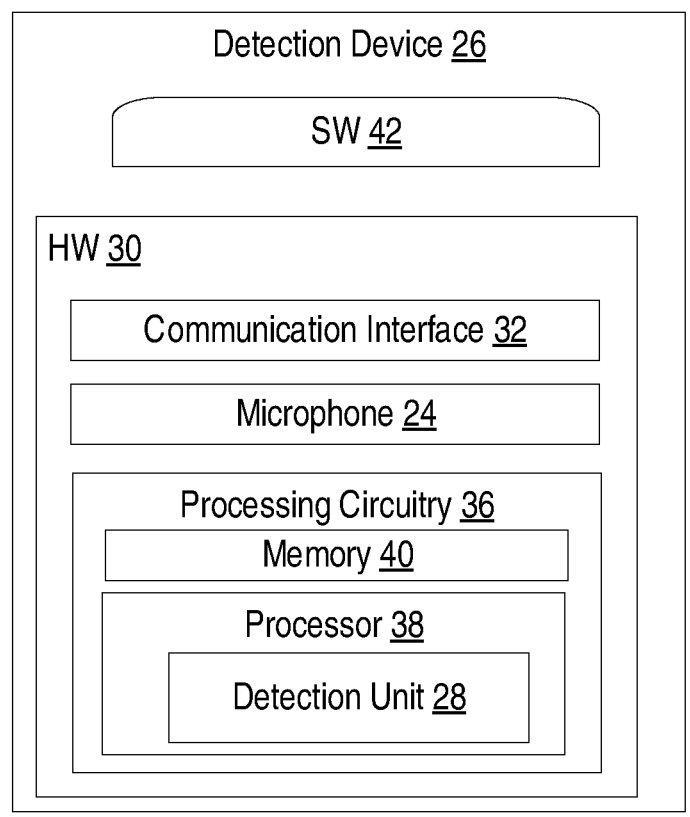
FIG. 2 is a diagram of a detection device according to the principles of the present disclosure.

With respect to FIG. 2, the system 10 includes detection device 26 that includes hardware 30 facilitating the detection device 26 to communicate with one or more entities in system 10 and to perform one or more functions described herein. The hardware 30 may include a communication interface 32 for setting up and maintaining at least a wired and/or wireless connection to one or more entities in system 10. The hardware 30 may include one or more microphones 34 (collectively referred to as "microphone 34") for receiving audible signals such as audible alarm signals.

In the embodiment shown, the hardware 30 of the detection device 26 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors, processor cores, field programmable gate arrays (FPGAs), and/or application specific integrated circuits (ASICs) adapted to execute instructions. The processor 38 may be configured to access (e.g., write to and/or read from) the memory 40, which may comprise any kind of volatile and/or nonvolatile memory, e.g., cache, buffer memory, random access memory (RAM), read-only memory (ROM), optical memory and/or erasable programable read-only memory (EPROM). Further, processing circuitry 36 may include and/or provide the functionality of an analog-to-digital converter for converting the detected analog signal to a digital signal for analysis.

Thus, the control device 15 further has software 42 stored internally in, for example, memory 40, or stored in external memory (e.g., database, storage array, network storage device, etc.) accessible by the detection device 26 via an external connection. The software 42 may be executable by the processing circuitry 36. The processing circuitry 36 may be configured to control any of the methods and/or processes described herein and/or to cause such methods, and/or processes to be performed, e.g., by detection device 26. Processor 38 corresponds to one or more processors 38 for performing detection device 26 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to detection device 26. For example, processing circuitry 36 of the detection device 26 may include detection unit 28 that is configured to perform one or more detection device 26 functions described herein, such as with respect to spectrogram-based alarm signal detection as described herein.

Although FIGS. 1-2 show detection unit 28 as being within a respective processor, this unit may be implemented such that a portion of the unit is stored in a corresponding memory within the processing circuitry. In other words, the unit may be implemented in hardware or in a combination of hardware and software within the processing circuitry.

Figure 3:
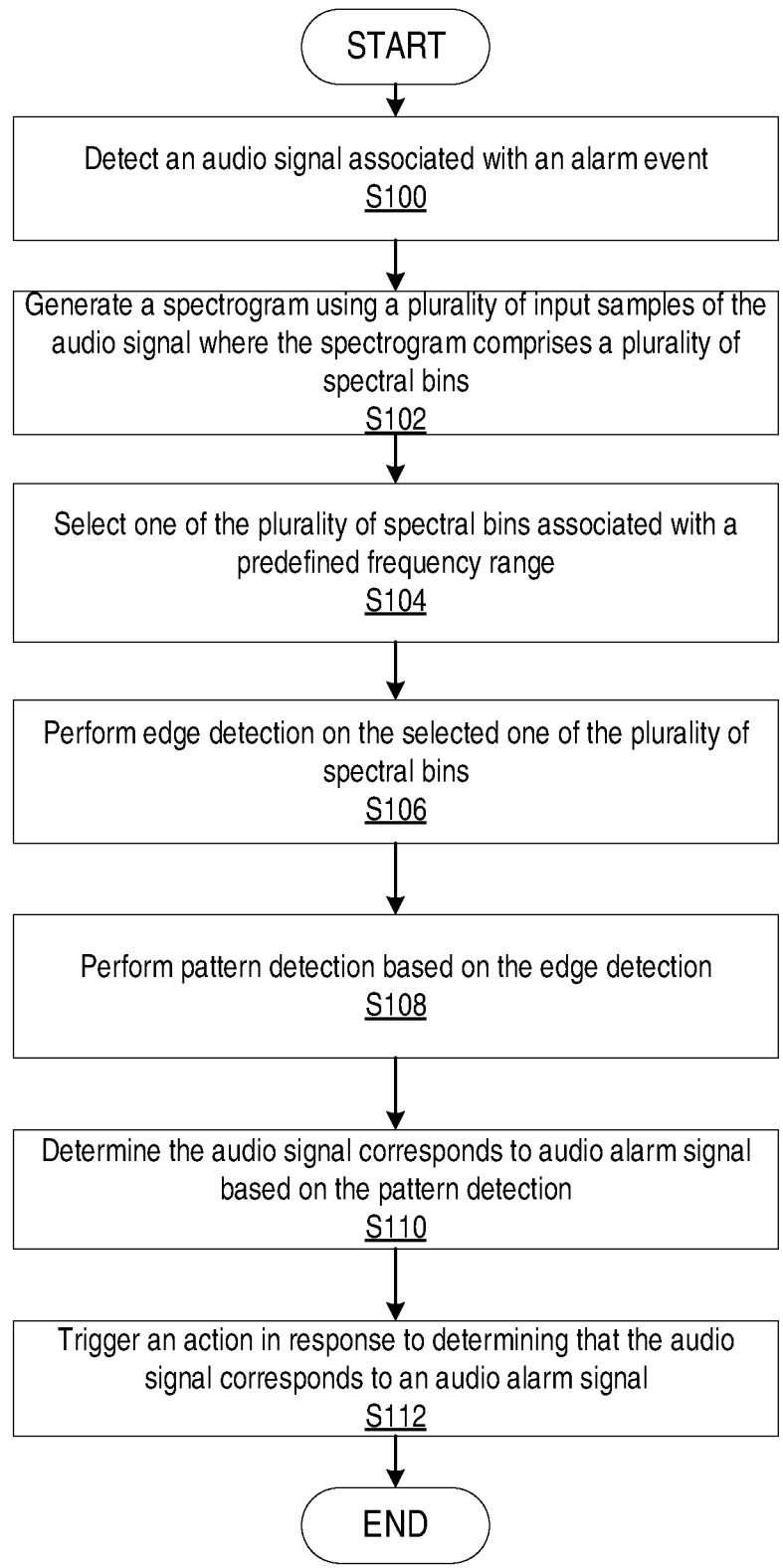
FIG. 3 is a flowchart of an example process according to the principles of the present disclosure.

FIG. 3 is a flowchart of an example process according to some embodiments of the present disclosure. One or more blocks described herein may be performed by one or more elements of detection device 26, such as by one or more of processing circuitry 36 and/or processor 38 and/or communication interface 32 and/or detection unit 28. Detection device 26 is configured to detect (Block S100) an audio signal associated with an alarm event, as described herein. Detection device 26 is configured to generate (Block S102) a spectrogram using a plurality of input samples of the audio signal where the spectrogram comprises a plurality of spectral bins, as described herein. Detection device 26 is configured to select (Block S104) one of the plurality of spectral bins associated with a predefined frequency range, as described herein.

Detection device 26 is configured to perform (Block S106) edge detection on the selected one of the plurality of spectral bins, as described herein. Detection device 26 is configured to perform (Block S108) pattern detection based on the edge detection, as described herein. Detection device 26 is configured to determine (Block S110) the audio signal corresponds to an audio alarm signal based on the pattern detection, as described herein. Detection device 26 is configured to trigger (Block S112) an action in response to determining that the audio signal corresponds to an audio alarm signal, as described herein.

According to one or more embodiments, each of the plurality of spectral bins corresponds to a respective frequency range over a predefined time period in the spectrogram.

According to one or more embodiments, the processing circuitry 36 is further configured to: determine a set of pulse-edge characteristics for the selected one of the plurality of spectral bins based on the edge detection, and perform the pattern detection further based on the set of pulse-edge characteristics.

According to one or more embodiments, the set of pulse-edge characteristics comprises a plurality of pulse-edge times and directions, and where the processing circuitry 36 is further configured to perform the pattern detection based on the set of pulse-edge characteristics.

According to one or more embodiments, the set of pulse-edge characteristics comprises a sample index and a value of each signal peak that exceeds a threshold.

According to one or more embodiments, the spectrogram is configured to contain at least one time period of a predefined temporal pattern associated with the audio alarm signal.

According to one or more embodiments, the action comprises causing transmission of a notification that indicates an alarm sensor has triggered an alarm.

According to one or more embodiments, the device 26 is not configured to be in data communication with the alarm sensor.

According to one or more embodiments, the pattern detection is performed based on a pattern detection criterion associated with one of a plurality of audio alarm signal types where each audio alarm signal type is associated with a respective pattern detection criterion. For example, detection device 26 may be configured to perform a separate detection for each audio alarm signal type such that detection device 26 may, for example, perform pattern detection for a fire alarm using a first pattern detection criterion and then perform pattern detection for a carbon monoxide alarm using a second pattern detection criterion different from the first pattern detection criterion. Each pattern detection criterion may define pulse-edge characteristics of a respective alarm type.

According to one or more embodiments, the one of the plurality of audio alarm signal types comprises a fire alarm, a smoke alarm, or a carbon monoxide alarm.

According to one or more embodiments, the processing circuitry 36 is further configured to determine a type of audio alarm of the audio alarm signal based on the pattern detection.

According to one or more embodiments, signal presence detection may be performed optionally within a spectral bin of the spectrogram such as to determine whether further processing of spectral bin is needed or warranted prior to pattern detection and/or alarm type determination. However, signal presence detection may not be required as a step such that pattern detection may be performed without first determining a signal (e.g., audio signal) has been detected.

Another example process for audio alarm detection is as follows. Detection device 26 generates a spectrogram based on blocks of input samples of a detected signal. In one or more embodiments, the sample rate may be selected according to a Nyquist criterion. The time extent of the spectrogram is selected or configured to contain at least one period of the temporal pattern of interest. The degree of overlap is selected for sufficient time resolution in the detection of the pulse-on and pulse-off phases. For example, to detect a pulse of a specified width of 0.5 s+/−10%, the spectrogram may need sufficient resolution to determine whether the pulse width is between 0.45 s and 0.55 s. Selecting a degree of overlap such that the spectrogram is calculated at a rate of 1/0.05 s=20 frames per second would be sufficient in this example. If the system sample rate is 8 kHz and the FFT size is 1024, that would correspond to a degree of overlap of approximately 61%.

The use of the spectrogram facilitates detection of a low-level signal of interest in the presence of a higher-level interfering signal at a nearby frequency.

For each spectral bin in the frequency range of interest, detection device 26 performs edge detection across the corresponding block of magnitude-versus-time samples of the spectral bin. A set of features is derived from the result as pairs consisting of sample index and value of each peak whose magnitude exceeds a threshold, such that each feature represents a candidate pulse-edge time and direction.

Detection device 26 performs pattern detection where a pattern-detection decision is made based on analysis of the feature set. In another example, pattern detection is performed using a neural network. In one example, pattern detection is performed using an ad-hoc tree-structure-based detector. Example programming code for the ad-hoc-tree-structure-based detector is reproduced below.

Hence, the process described herein is able to detect an audible alarm signal even if there are temporal-pattern phase-duration deviations that would otherwise result in a false-negative decision in the case of a matched filter detector implementation.

Figure 4:
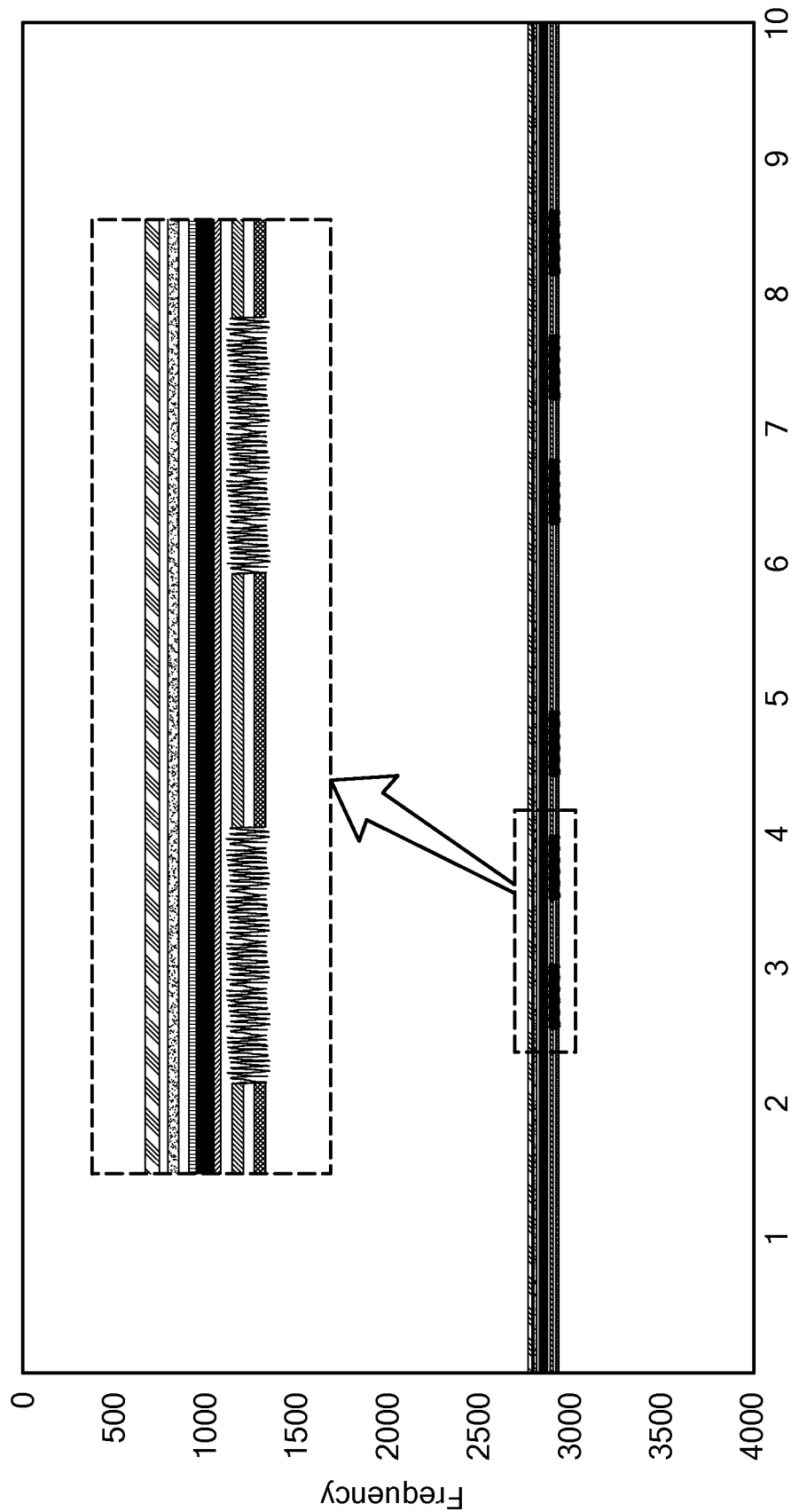
FIG. 4 is a diagram of an example spectrogram according to the principles of the present disclosure.

FIG. 4 is a diagram of an example spectrogram according to some embodiments of the present disclosure. With respect to the spectrogram, the vertical axis represents frequency, the horizontal axis represents time or time samples and the color represents amplitude. In this example, a detected temporal signal is shown plus white noise and sinusoidal interference. The temporal signal in this example may be a smoke alarm signal having signal characteristics associated with this type of alarm.

The detected temporal signal in FIG. 4 has a signal pulse-on time of 0.5 seconds and signal frequency of 2918 Hz. The interference frequency is 2849 Hz where the signal-to-noise ratio and signal-to-interference ratio associated with the detected signal is −6 dB and −12 dB, respectively. Hence, even with an interfering signal present in the spectrogram, detection device 26 can still detect the signal of interest (audible alarm signal). The interfering signal may have a higher amplitude than the audible alarm signal.

Figure 5:
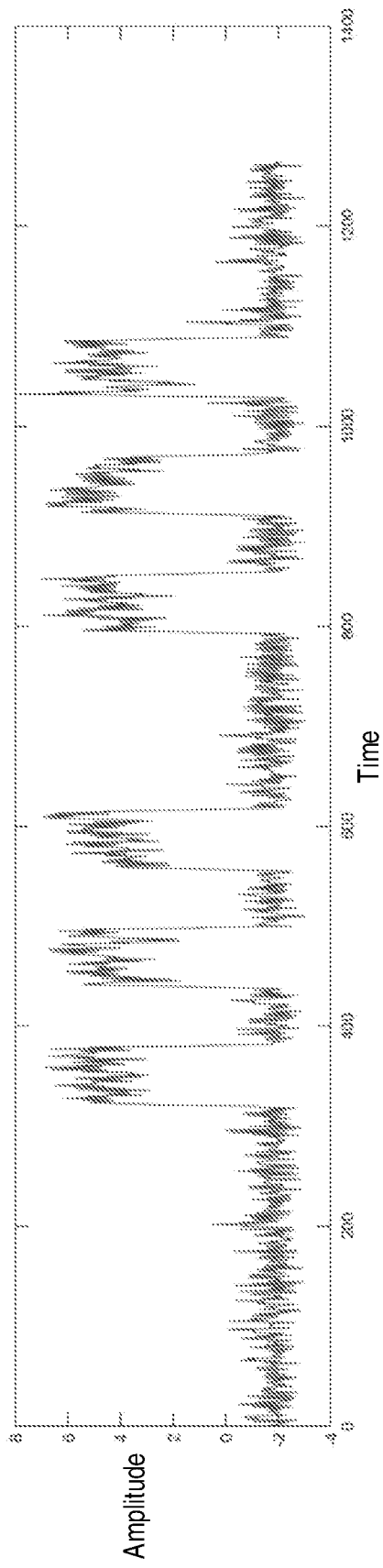
FIG. 5 is a diagram of an example spectral bin according to the principles of the present disclosure.

FIG. 5 is a diagram of a spectral bin of the spectrogram of FIG. 4 according to some embodiments of the present disclosure. In one example, a spectral bin may be generated from the spectrogram by performing FFTs on successive blocks of input data, and each resulting bin represents magnitude versus time at a particular frequency. Detection device 26 selects a spectral bin of a plurality of spectral bins at or nearest a signal frequency of interest. For example, different types of audible alarms (e.g., fire alarm, smoke alarm, carbon monoxide alarm, etc.) are associated with certain predefined frequency ranges such that detection device 26 may select a spectral bin at or nearest to a certain frequency or frequency range when searching for a specific type of alarm. In one example, the spectral bin is selected such that the interfering signal is not included in the selection.

Figure 6:
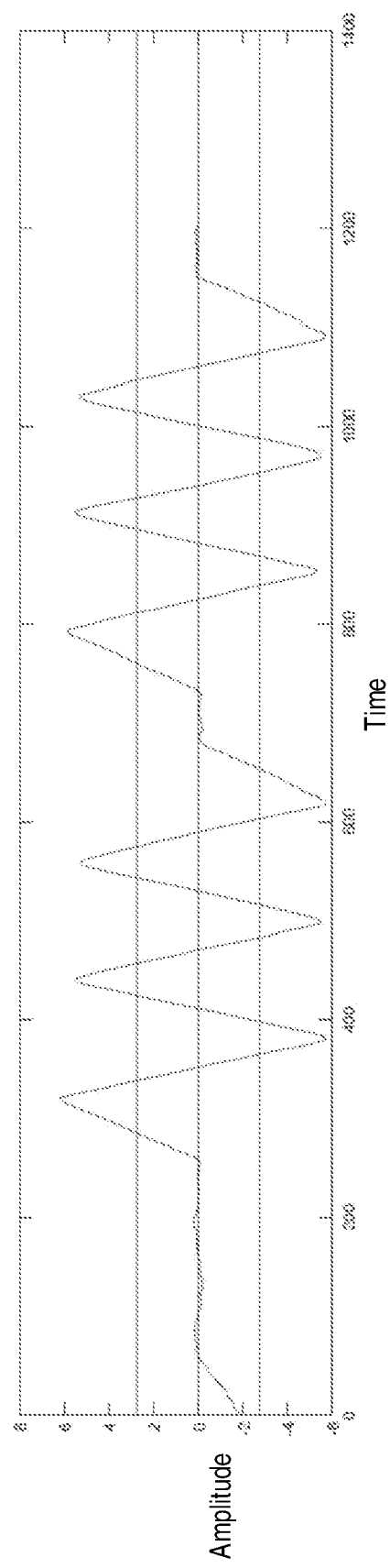
FIG. 6 is a diagram of an example edge detection according to the principles of the present disclosure.

FIG. 6 is a diagram of an example of edge detection of the spectral bin of FIG. 5 according to some embodiments of the present disclosure. Edge detection provides a set of pulse-edge characteristics such as, for example, pulse-edge times and direction, sample index, and a value of each signal peak that exceeds a threshold. The thresholds in FIG. 6 are used to detect positive and negative pulses.

Further, in one or more embodiments, the threshold setting are configured or set based on the type of alarm. For example, in the case of a T3 signal, the thresholds may be set at one standard deviation away from the mean of the block of samples comprising the output of the edge detector. In the case of a T4 signal, the thresholds may be set at two standard deviations.

Example programming code for the ad-hoc-tree-structure-based detector is reproduced below.

```
---------------Start----------------
#include <vector>
#include <set>
struct Node
{
   int runLength { 0 };
   int runChildId { -1 };
   std::vector<int> childIds;
   void addChildId(int k) {
      childIds.push_back(k);
   }
};
```

/* Compute confidence metric [0.0, 1.0] for an edge pattern of alternating direction, constant nominal distance between edges, and a specified deviation in the actual distance between each pair of adjacent edges, as in the T3 and T4 alarm pattern specifications

```
*/
float computeMetric (
   const std::vector<int> &dir, // edge direction (0 or 1)
   const std::vector<int> &loc, // edge location (sample index)
   int Lmin, // minimum tolerated edge separation
   int Lmax, // maximum tolerated edge separation
   int Lnom, // nominal specified edge separation
   int expectedRunLength // expected run length (number of edges minus one)
)
{
   std::vector<Node> nodeVector;
   int M { (int) dir.size( ) };
   const int RootId { -1 };
   std::vector<int> parentId(M, RootId);
   std::set<int> runNodeIds;
   // Construct the tree
   for (int m = 0; m < M; m++) {
      Node node;
      for (int k = m + 1; k < M; k++) {
         if (dir[k] != dir[m] && parentId[k] == RootId) {
            int L = loc[k] - loc[m];
            if (L >= Lmin && L <= Lmax) {
               node.addChildId(k);
               parentId[k] = m;
            }
         }
      }
      nodeVector.push_back(node);
   }
   // Compute run length at each node
   for (int m = M - 1; m >= 0; m--) {
      if (nodeVector[m].childIds.size( ) > 0) {
         int r = 0;
         for (auto k : nodeVector[m].childIds) {
            if (nodeVector[k].runLength >= r) {
               r = nodeVector[k].runLength;
               nodeVector[m].runChildId = k;
            }
         }
      }
   }
```

```
      nodeVector[m].runLength = 1 + r;
   }
   else { nodeVector[m].runLength = 0; }
}
// Find max run length and initial node of run
int maxRunLength { 0 };
int maxRunNodeId { -1 };
for (int m = 0; m < M; m++) {
   if (parentId[m] == RootId) {
      if (nodeVector[m].runLength > maxRunLength) {
         maxRunLength = nodeVector[m].runLength;
         maxRunNodeId = m;
      }
   }
}
// Compute confidence metric between 0.0 and 1.0
float metric { 0.0 };
if (maxRunLength > 0) {
   int runTotal { 0 };
   int m { maxRunNodeId };
   runNodeIds.insert(m);
   while (nodeVector[m].runChildId >= 0) {
      int k { nodeVector[m].runChildId };
      runTotal += loc[k] - loc[m];
      m = k;
      runNodeIds.insert(m);
   }
   int lastRunNodeId { m };
   int denom { runTotal };
   denom += std::abs(maxRunLength - expectedRunLength) * Lnom;
   for (int m = maxRunNodeId + 1; m < lastRunNodeId; m++) {
      if (runNodeIds.count(m) == 0) {
         denom += loc[m] - loc[m-1];
      }
   }
   metric = runTotal / (float) denom;
}
return metric;
}
---------------End----------------
```

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams may include arrows on communication paths to show a primary direction of communication, communication may occur in the opposite direction of the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination.

The present disclosure is not limited to what has been specifically shown and described herein above. In addition, unless mention was made above to the contrary, the accompanying drawings are not to scale. A variety of modifications and variations are possible in light of the above teachings without departing from the scope and spirit of the invention.

What is claimed is:

1. A device, comprising:
processing circuitry configured to:
    detect an audio signal associated with an alarm event;
    generate a spectrogram using a plurality of input samples of the audio signal;
    generate a plurality of spectral bins based on the spectrogram, each spectral bin being a time-magnitude bin corresponding to a respective frequency range over a predefined time period in the spectrogram;
    select one of the plurality of spectral bins associated with a predefined frequency range;
    determine a plurality of pulse-edge characteristics of the selected one of the plurality of spectral bins by at least performing edge detection on the selected one of the plurality of spectral bins;
    perform pattern detection based on the plurality of pulse-edge characteristics of the selected one of the plurality of spectral bins;
    determine the audio signal corresponds to an audio alarm signal based on the pattern detection; and
    trigger an action in response to determining that the audio signal corresponds to an audio alarm signal.

2. The device of claim 1, wherein the plurality of pulse-edge characteristics comprises a plurality of pulse-edge times and directions, and wherein the processing circuitry is further configured to perform the pattern detection based on the plurality of pulse-edge characteristics.

3. The device of claim 1, wherein the plurality of pulse-edge characteristics comprises a sample index and a value of each signal peak that exceeds a threshold.

4. The device of claim 1, wherein the spectrogram is configured to contain at least one time period of a predefined temporal pattern associated with the audio alarm signal.

5. The device of claim 1, wherein the action comprises causing transmission of a notification that indicates an alarm sensor has triggered an alarm.

6. The device of claim 5, wherein the device is not configured to be in data communication with the alarm sensor.

7. The device of claim 1, wherein the pattern detection is performed based on a pattern detection criterion associated with one of a plurality of audio alarm signal types, each audio alarm signal type being associated with a respective pattern detection criterion.

8. The device of claim 7, wherein the one of the plurality of audio alarm signal types comprises:
    a fire alarm;
    a smoke alarm; or
    a carbon monoxide alarm.

9. A method implemented by a device, the method comprising:
    detecting an audio signal associated with an alarm event;
    generating a spectrogram using a plurality of input samples of the audio signal;
    generating a plurality of spectral bins based on the spectrogram, each spectral bin being a time-magnitude bin corresponding to a respective frequency range over a predefined time period in the spectrogram;
    selecting one of the plurality of spectral bins associated with a predefined frequency range;
    determining a plurality of pulse-edge characteristics of the selected one of the plurality of spectral bins by at least performing edge detection on the selected one of the plurality of spectral bins;
    performing pattern detection based on the plurality of pulse-edge characteristics of the selected one of the plurality of spectral bins;
    determining the audio signal corresponds to an audio alarm signal based on the pattern detection; and
    triggering an action in response to determining that the audio signal corresponds to an audio alarm signal.

10. The method of claim 9, wherein the plurality of pulse-edge characteristics comprises a plurality of pulse-edge times and directions, and wherein the method further comprises performing the pattern detection based on the plurality of pulse-edge characteristics.

11. The method of claim 9, wherein the plurality of pulse-edge characteristics comprises a sample index and a value of each signal peak that exceeds a threshold.

12. The method of claim 9, wherein the spectrogram is configured to contain at least one time period of a predefined temporal pattern associated with the audio alarm signal.

13. The method of claim 9, wherein the action comprises causing transmission of a notification that indicates an alarm sensor has triggered an alarm.

14. The method of claim 13, wherein the device is not configured to be in data communication with the alarm sensor.

15. The method of claim 9, wherein the pattern detection is performed based on a pattern detection criterion associated with one of a plurality of audio alarm signal types, each audio alarm signal type being associated with a respective pattern detection criterion.

16. The method of claim 15, wherein the one of the plurality of audio alarm signal types comprises:
    a fire alarm;
    a smoke alarm; or
    a carbon monoxide alarm.

* * * * *